United States Patent
Mann et al.

(10) Patent No.: US 7,902,510 B2
(45) Date of Patent: Mar. 8, 2011

(54) RADIONUCLIDE DETECTION DEVICES AND ASSOCIATED METHODS

(75) Inventors: Nicholas R. Mann, Rigby, ID (US);
Tedd E. Lister, Idaho Falls, ID (US);
Troy J. Tranter, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 188 days.

(21) Appl. No.: 12/268,559

(22) Filed: Nov. 11, 2008

(65) Prior Publication Data

US 2010/0276599 A1  Nov. 4, 2010

(51) Int. Cl.
*G01T 1/20* (2006.01)
(52) U.S. Cl. ........................................................ 250/362
(58) Field of Classification Search .................. 250/362; 252/682
See application file for complete search history.

(56) References Cited

U.S. PATENT DOCUMENTS

| 4,008,393 A | 2/1977 | Rapkin |
| 4,194,117 A | 3/1980 | Gross |
| 4,216,071 A | 8/1980 | Gobrecht |
| H801 H * | 7/1990 | Koechner et al. .............. 250/368 |
| 5,559,324 A | 9/1996 | Rapkin et al. |
| 5,656,817 A * | 8/1997 | Bower et al. .............. 250/370.02 |
| 5,856,670 A | 1/1999 | Rapkin et al. |
| 6,229,146 B1 | 5/2001 | Cochran et al. |
| 2007/0051892 A1* | 3/2007 | Warburton et al. ............ 250/362 |

OTHER PUBLICATIONS

Hughes et al., "Evaluation of flow cell detector configurations combining simultaneous preconcentration and scintillation detection for monitoring of pertechnetate in aqueous media," Apr. 2006, Analytical Chemistry, vol. 78, No. 7, pp. 2254-2251.*

* cited by examiner

*Primary Examiner* — David P Porta
*Assistant Examiner* — Kiho Kim
(74) *Attorney, Agent, or Firm* — TraskBritt

(57) ABSTRACT

Radionuclide detection devices comprise a fluid cell comprising a flow channel for a fluid stream. A radionuclide collector is positioned within the flow channel and configured to concentrate one or more radionuclides from the fluid stream onto at least a portion of the radionuclide collector. A scintillator for generating scintillation pulses responsive to an occurrence of a decay event is positioned proximate at least a portion of the radionuclide collector and adjacent to a detection system for detecting the scintillation pulses. Methods of selectively detecting a radionuclide are also provided.

25 Claims, 2 Drawing Sheets

RADIONUCLIDE DETECTION DEVICES AND ASSOCIATED METHODS

GOVERNMENT RIGHTS

This invention was made with government support under Contract No. DE-AC07-05-ID14517, awarded by the United States Department of Energy. The government has certain rights in the invention.

TECHNICAL FIELD

Embodiments of the present invention relate to apparatus and methods for the detection of radioactivity and, more particularly, the selective collection and detection of radionuclides in a fluid stream.

BACKGROUND

Devices for monitoring radioactivity have broad utilization in a variety of governmental, industrial, and scientific applications. Monitoring devices may, for example, be employed for environmental applications as well as national security programs. In environmental applications, for example, monitoring devices may be employed to monitor ground water quality or measure and track isotope plumes at nuclear power stations and Department of Energy facilities. For national security programs, monitoring devices may be employed in programs tasked with nuclear non-proliferation detection and monitoring.

Some of these activities cannot conventionally be carried out with monitoring equipment positioned at the specific location to be monitored. Instead, conventional monitoring techniques generally include physically collecting samples at the specific location and transporting the samples to analytical laboratories where lengthy and expensive separation procedures are performed. For example, in order to monitor ground and surface water for specific radionuclides having relatively long to moderate half-lives such as the isotopes strontium-90 (Sr-90) and technetium-99 (Tc-99), which decay by pure beta particle emission and do not release any measurable gamma or X-rays, samples from the water sources must be collected and transported to a remote testing facility. This kind of monitoring for ground and surface water locations typically occurs at frequencies ranging from monthly to yearly, depending on the location of the water wells and the contamination levels. Furthermore, the collection of the necessary physical samples from remote locations is often difficult when weather conditions such as snow and rain make physically reaching the wells dangerous and/or difficult.

One type of conventional radioactivity detection system includes a flow-through detector that continuously monitors the radiation from samples flowing through a cell. Some of these systems require that the solution to be monitored must include or be mixed with a liquid scintillation fluid. Decay events excite the liquid scintillation fluid to produce light, which can then be detected and measured. However, relatively large amounts of scintillation fluid must be used for the system to work accurately and the mixture must then be safely disposed.

Radioactivity detection systems exist that eliminate the need for a scintillation fluid. Such systems employ the use of an insoluble scintillator over which the fluid being tested may flow. However, such systems may not be accurate in detecting an amount of radioactivity in the sample fluid.

BRIEF SUMMARY

Various embodiments of the present invention comprise radionuclide detection systems or devices configured to selectively collect and detect one or more specific types of radionuclides from a fluid stream. In one or more embodiments, the radionuclide detection device may comprise a fluid cell configured to pass a fluid stream therethrough. A radionuclide collector may be configured to concentrate one or more radionuclides from the fluid stream onto at least a portion thereof. A scintillator may be positioned near at least a portion of the radionuclide collector.

Other embodiments comprise methods for detecting radionuclides. One or more embodiments of such methods may comprise passing a fluid through a chamber between a first electrode and a second electrode positioned therein. An electrical potential may be applied between the first electrode and the second electrode and a plurality of radionuclides may be concentrated from the fluid stream adjacent the first electrode. One or more scintillation pulses may be generated in a scintillator positioned near the first electrode upon the occurrence of a decay event in at least one radionuclide concentrated adjacent the first electrode. At least one scintillation pulse may be detected in a detection system.

DETAILED DESCRIPTION

The illustrations presented herein are, in some instances, not actual views of any particular radionuclide collection and detection device, but are merely idealized representations that are employed to describe the present invention. Additionally, elements common between figures may retain the same numerical designation.

Figure 1:
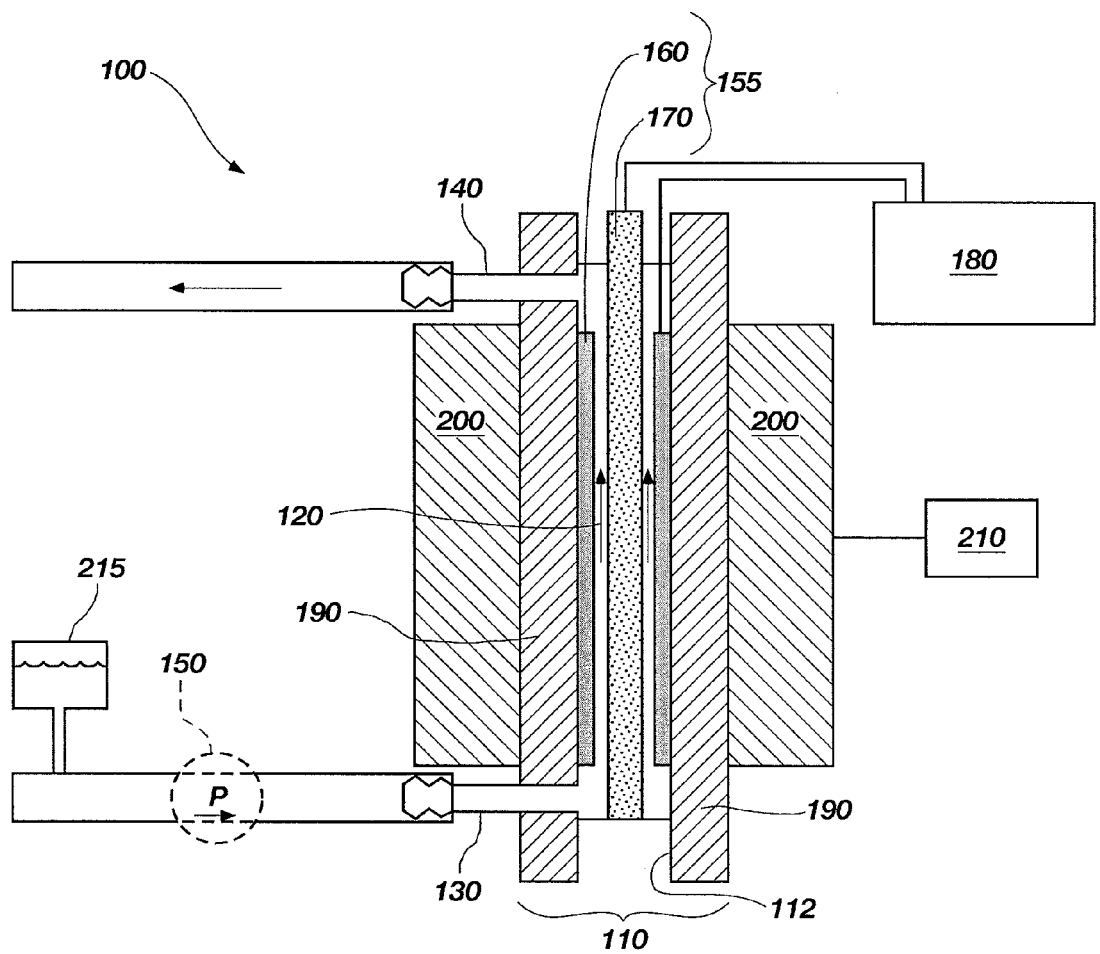
FIG. 1 is a cut-away elevational view of a radionuclide detection device along axis line A-A of FIG. 2, according to one embodiment of the present invention.

One embodiment of the present invention provides a detection device for collecting radionuclides from a fluid stream onto an electrode and detecting decay events relating to the collected radionuclides. FIG. 1 is a cross-sectional elevation view of a radionuclide detection device 100 and FIG. 2 ia a top view of the radionuclide detection device 100 according to one embodiment of the present invention. The radionuclide detection device 100 comprises a fluid cell 110 including a flow channel 120 through which a stream of the fluid to be tested may flow. A radionuclide collector 155 may be positioned within the flow channel 120. A scintillator 190 may be positioned in communication with the fluid cell 110 and near or adjacent to the radionuclide collector 155.

The fluid cell 110 may comprise a fluid inlet 130 in communication with the flow channel 120 and through which the test fluid may enter the flow channel 120. At an opposing end from the fluid inlet 130, the fluid cell 110 may comprise a fluid outlet 140 in communication with the flow channel 120 and through which the test fluid may exit the flow channel 120, as shown by the arrows. The direction of flow as depicted in FIG. 1 is arbitrary and may flow in either direction. Similarly, the depicted circular cross-sectional geometry of the fluid cell 110 is not limiting of the invention to a specific geometry.

Indeed, the direction of the flow through the fluid cell 110 and the geometry of the fluid cell 110 may be configured in a variety of different ways according to the specific application. By way of example and not by way of limitation, the fluid cell 110 may comprise a cross-sectional geometry consisting of any one of round, oval, rectangular, square, etc. Furthermore, the fluid cell 110 may take any desired shape and/or path geometry according to the needs of the specific application. An optional pump 150, as illustrated by dashed line circle in FIG. 1, may be coupled to the fluid inlet 130 or the fluid outlet 140 and configured to pass a fluid through the flow channel 120.

The radionuclide detection device 100 may further include a radionuclide collector 155 configured to concentrate one or more radionuclides that may be present in the fluid stream onto at least a portion of the radionuclide collector 155. In at least one embodiment, the radionuclide collector 155 may comprise a first electrode 160 and a second electrode 170 positioned within the flow channel 120. The first electrode 160 may be positioned adjacent a wall defining at least a portion of the flow channel 120. The first electrode 160 may comprise a conductive or semiconductive material and may be configured so that any decay events may pass uninhibited toward the wall defining the at least a portion of the flow channel 120. By way of example and not by way of limitation, the first electrode 160 may comprise a mesh-like structure through which a decay event may easily pass toward the wall defining the at least a portion of the flow channel 120. Such a mesh-like structure may comprise a wire filament formed from a conductive material such as platinum or gold, which has been weaved together leaving small openings throughout the structure. The second electrode 170 may be positioned in the flow channel 120 relative to the first electrode 160 so that any fluid in the flow channel 120 is positioned between the first electrode 160 and the second electrode 170. Therefore, because of the position of the first electrode 160 and the second electrode 170, any fluid flowing through the flow channel 120 flows in an area or space between the first electrode 160 and the second electrode 170 through at least a portion of the flow channel 120. In some embodiments, such as the embodiment illustrated in FIGS. 1 and 2, the second electrode 170 may be substantially centrally positioned in the flow channel 120. The actual positioning of the first electrode 160 and the second electrode 170 is not limited to a specific configuration, so long as the fluid stream will flow between the two electrodes 160, 170. Similar to the first electrode 160, the second electrode 170 may comprise any suitable conductive or semiconductive material. By way of example and not by way of limitation, the second electrode 170 may comprise a rod-like structure comprising a conductive material. The first electrode 160 and the second electrode 170 are each coupled to a potentiostat or power supply 180 configured to provide a difference in electrical charge (electrical potential) between the first electrode 160 and the second electrode 170.

Figure 3:
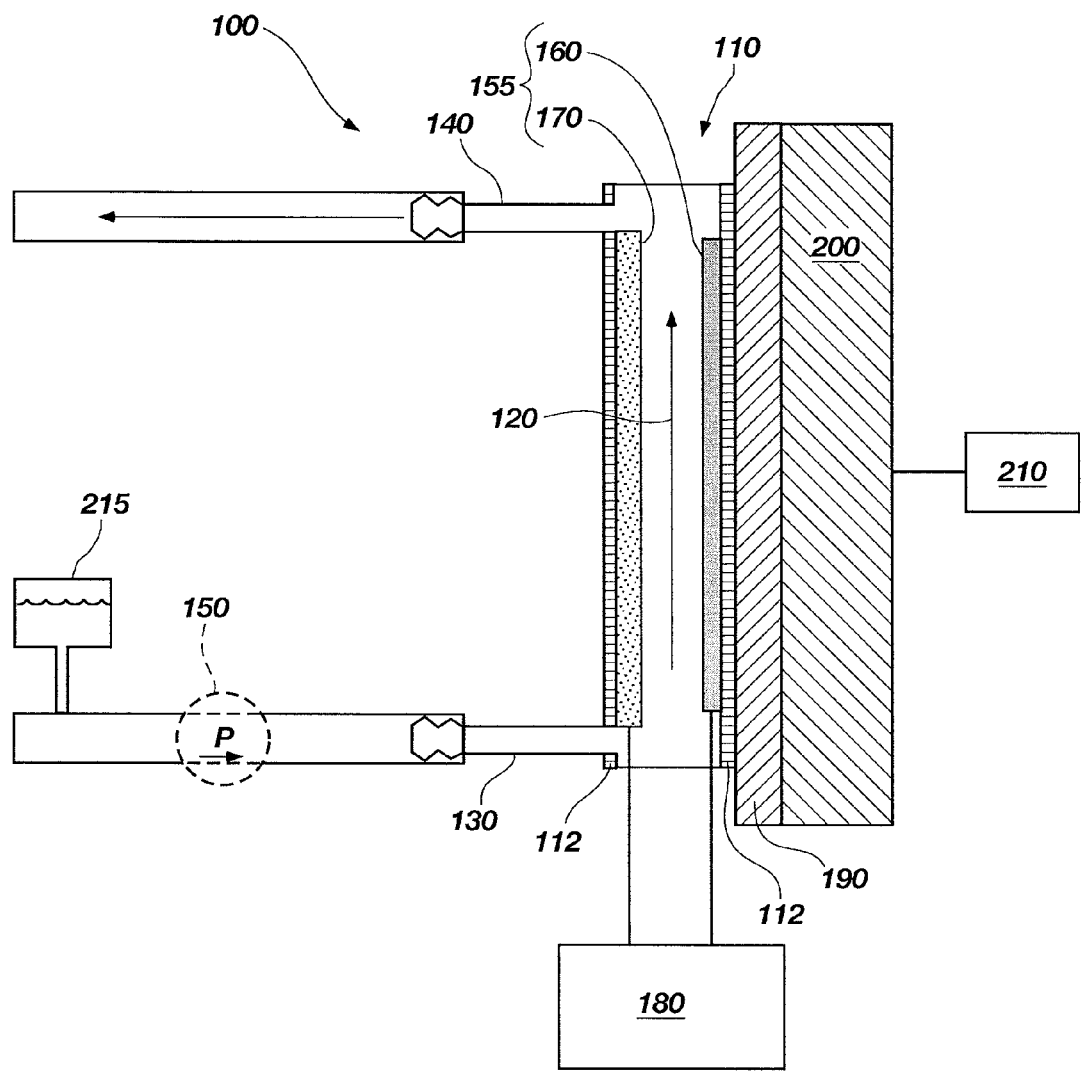
FIG. 3 is a cross-sectional elevation view of a radionuclide detection device according to one embodiment of the present invention.

A scintillator 190 is configured and positioned adjacent to the fluid cell 110 and near the portion of the radionuclide collector 155 onto which the one or more radionuclides are concentrated. In the example described above in which the radionuclide collector 155 comprises first and second electrodes 160, 170, the scintillator 190 may be positioned near the first electrode 160. In some embodiments, the scintillator 190 may form at least a portion of a surface at least one of the walls 112 defining the flow channel 120. By way of example and not by way of limitation, the fluid cell 110 may be formed entirely of the scintillator 190, in which case the fluid cell 110 comprises both the flow channel 120 and the scintillator 190, as illustrated in FIG. 1. The scintillant material from which the scintillator 190 is made may be formed into a desired fluid cell 110, or the fluid cell 110 may be formed in the scintillator 190 by, for example, drilling through the scintillant material. By way of another non-limiting example, the scintillator 190 may be positioned adjacent a wall defining the flow channel 120, as illustrated in FIG. 3. The scintillator 190 may be positioned in a recess along a wall defining the flow channel 120 or the scintillator 190 may be positioned over a wall defining the flow channel 120.

The scintillator 190 may comprise any suitable scintillant material as is known by those of ordinary skill in the art. In one embodiment, the scintillator 190 may comprise a solid scintillant material, such as that found in a conventional plastic scintillator. In other embodiments, the scintillator 190 may comprise a contained liquid scintillant material, such as a conventional liquid scintillant material contained within a closed tube, the material from which the tube is made being transparent to decay events. The scintillator 190, whether it is made up of a solid or liquid scintillant material, may comprise any scintillant material that will produce an effect in response to a decay event. Conventionally, a scintillant material produces radiation emissions, such as light, in response to a decay event, but any scintillant material may be employed so long as it produces a detectable emission or signal in response to a decay event. Another non-limiting example of a scintillant material includes the materials comprising so-called "mediated scintillators" wherein a decay event creates an effect in one substance, which in turn causes a second, associated substance to produce radiation or some other detectable emission. By way of example and not by way of limitation, suitable scintillators 190 may include solid and liquid scintillators manufactured by Rexon Components, Inc. of Beachwood, Ohio and Saint-Gobain Crystals of Newbury, Ohio. One non-limiting example of a conventional plastic scintillator 190 may comprise polyvinyltoluene doped with various amounts of anthracene. Scintillators and scintillation materials are known to those of ordinary skill in the art and may be selected according to the specific application and/or the radionuclides to be detected.

A detection system 200 may be positioned generally adjacent to the fluid cell 110. As described above, the scintillator 190 typically emits radiation in response to a decay event. Therefore, the detection system 200 may generally comprise detectors that are sensitive to radiation and react to the radiation emitted by the scintillator 190 by generating an output signal proportionate to the amount of radiation detected. In other words, the detection system 200 will convert and amplify a relatively weak output of a scintillation pulse into a corresponding electrical signal, generally defined by an output voltage proportionate to the amount of radiation detected. By way of example and not by way of limitation, some embodiments of the detection system 200 may comprise a plurality of conventional photodiodes, while other non-limiting embodiments may comprise conventional photomultiplier tubes, both of which components are known to those of ordinary skill in the art. In some embodiments, the detection system 200 may further comprise circuitry or other instrumentation such as communication device 210 (FIG. 1) to convert the electrical output signal to a digital value.

In some embodiments the detection system 200 may also be coupled to a communication device 210 configured to transmit detection data from the detection device 100 to a remote location. For example, the communication device 210 may comprise conventional telemetry providing remote network access and/or remote communication as is known by those of ordinary skill in the art.

FIG. 3 is a cross-sectional elevation view of a radionuclide detection device 100, according to another embodiment of the present invention, comprising a fluid cell 110 including a flow channel 120. A radionuclide collector 155 comprised of a first electrode 160 and a second electrode 170 may be positioned in the flow channel 120. In this embodiment, the first electrode 160 and second electrode 170 may be positioned at opposing sides of the flow channel 120 such that a fluid stream passes between the two electrodes 160, 170. Similar to previously described embodiments, the first electrode 160 and second electrode 170 are coupled to a potentiostat or power supply 180 configured to provide a difference in electrical charge (electrical potential) between the first electrode 160 and the second electrode 170.

Furthermore, in some embodiments, as illustrated in FIG. 3, the scintillator 190 may be positioned adjacent an outer wall defining the flow chamber 110. In such embodiments, at least a portion of a wall 112 defining the flow chamber 110 may comprise a material that is generally transparent to decay events so as to allow the scintillator 190 to capture all possible decay events. By way of example and not by way of limitation, the at least a portion of the wall 112 defining the flow chamber 110 may comprise a material having an optimum index of refraction, such as quartz crystal. The scintillator 190 may comprise any scintillator such as those described above with reference to FIGS. 1 and 2. In addition, a detection system 200 may be provided and positioned generally adjacent to the scintillator 190. The detection system 200 may also be coupled to a communication device 210 configured to transmit detection data from the detection device 100 to a remote location.

Figure 2:
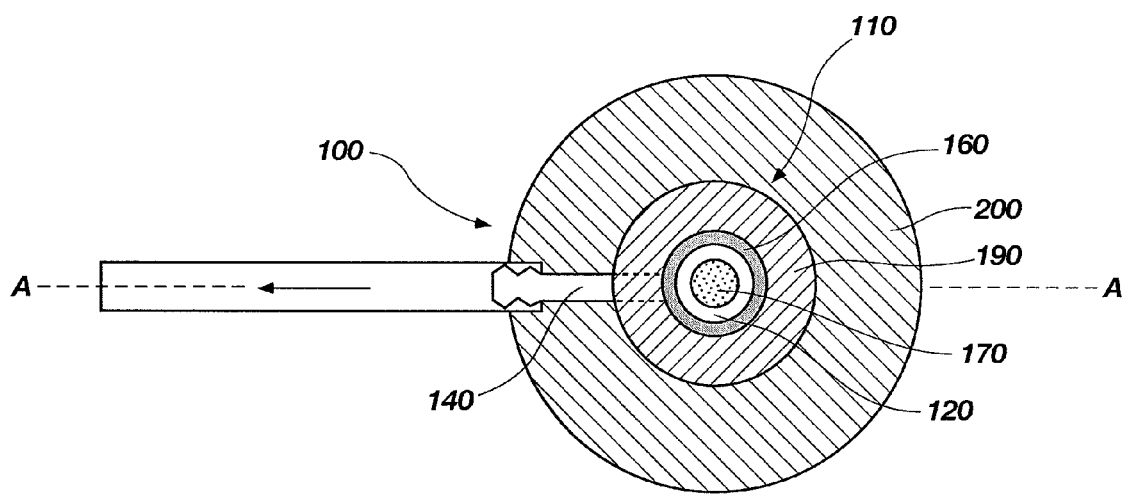
FIG. 2 is a top view of the radionuclide detection device of FIG. 1.

A radionuclide detection device 100 comprising any of the embodiments in FIGS. 1-3 may be employed to collect and detect radionuclides within a fluid stream by passing the fluid through the flow channel 120 adjacent at least a portion of the radionuclide collector 155. In embodiments employing the first electrode 160 and the second electrode 170, as the fluid passes through the flow channel 120, an electrical potential may be applied between the two electrodes by energizing the electrodes 160, 170 with the power supply 180. The electrical potential between the two electrodes 160, 170 may concentrate radionuclides from the fluid stream adjacent the first electrode 160 which, as described above, may be positioned near the scintillator 190. As decay events occur in the radionuclides concentrated adjacent the first electrode 160, corresponding scintillation pulses in the scintillator 190 are emitted and those scintillation pulses may be detected by the detection system 200. If the radionuclide detection device 100 is being used to monitor a test fluid such as ground water, the water may be passed through the flow channel 120 by natural convection in some embodiments or by employing the optional pump 150 to create adequate pressure for fluid flow. The fluid may flow through the flow channel 120 at a wide range of flow rates, including flow rates resulting in both non-turbulent flows and turbulent flow, so long as the radionuclide collector 155 is appropriately configured according to the specific flow characteristics to collect radionuclides from the test fluid. In embodiments comprising a communication device 210, the communication device 210 may transmit detection data relating to the scintillation pulses to a remote location.

The radionuclide collector 155 may be customized to capture a specific radionuclide of interest. In embodiments employing the first electrode 160 and the second electrode 170, such customization may be carried out by tuning the electrical potential applied between the two electrodes 160, 170. By way of example and not by way of limitation, in some applications it may be desirable to monitor levels of the radionuclide technetium-99 (Tc-99) in ground and/or surface water. Tc-99 may be precipitated on an electrode under specific reducing conditions and may be retained on the electrode so long as those reducing conditions are maintained. Specific potential or current values used to perform a capture of Tc-99 radionuclides depends on several factors including an actual configuration of a detection device, sizes of the electrodes, the flow characteristics, and the solution chemistry. The Tc-99 radionuclide is generally captured and concentrated on a cathode. Therefore, in order to isolate and properly detect the Tc-99 radionuclide, the electrical potential applied to the first electrode 160 and the second electrode 170 is configured so that the first electrode 160 functions as the cathode and the second electrode 170 functions as the anode. Such selective electrodeposition of a specific radionuclide is possible for a variety of radionuclides. Therefore, the parameters and configuration of the electrical potential may be selectively tuned and configured to capture and retain the radionuclide of interest adjacent the first electrode 160 so that the number of the selected radionuclide in the test fluid may be detected.

In some embodiments, an additive reservoir 215 may be coupled to the fluid inlet 130. The additive reservoir 215 is configured to add a predetermined amount of a chemical to the test fluid. In some embodiments, it may be desirable to change some chemical property of the test solution prior to or upon entering the flow channel 120. By way of example and not by way of limitation, it may be desirable to adjust the pH level of the test solution or to add specific ions to the test solution to aid in capturing the one or more radionuclides of interest. The specific chemical added to the test fluid depends on the chemical properties of the test solution. Therefore, a test solution, such as the ground and/or surface water used in the examples above, may be tested to determine certain chemical properties, such as the average pH level. With the chemical property or properties determined, a suitable quantity and composition for the chemical may be selected and placed in the additive reservoir 215. The additive reservoir 215 may be configured to release the selected quantity of the selected chemical into the fluid stream according to the flow rate of the test fluid and the desired change to the chemical property or properties of the test fluid. By way of example and not by way of limitation, suitable chemicals to be used in the additive reservoir 215 may include acids or bases for pH modification. Hydrochloric acid, sulfuric acid or sodium sulfate may be used to enhance the capture of Tc-99. Other chemicals may be employed, depending on the specific application.

While certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and legal equivalents, of the claims which follow.

What is claimed is:

1. A radionuclide detection device, comprising:
   a fluid cell configured to contain a fluid volume therein;
   a radionuclide collector configured to concentrate one or more radionuclides from the fluid volume onto at least a portion of the radionuclide collector, wherein the radionuclide collector comprises:
   at least one first electrode positioned within the fluid cell; and at least one second electrode positioned relative to the first electrode such that at least a portion of the fluid volume is positioned between the first electrode and the second electrode; and a scintillator configured and positioned adjacent the fluid cell proximate at least a portion of the radionuclide collector.

2. The radionuclide detection device of claim 1, wherein the at least one first electrode comprises a conductive or semiconductive material configured as a mesh.

3. The radionuclide detection device of claim 1, wherein the at least one first electrode and the at least one second electrode are positioned on adjacent opposing sides of the fluid cell.

4. The radionuclide detection device of claim 1, wherein the at least one first electrode is positioned adjacent a wall of the fluid cell and the at least one second electrode is positioned substantially centrally within the fluid cell.

5. The radionuclide detection device of claim 1, wherein the scintillator comprises at least one scintillator selected from the group consisting of a liquid scintillator contained within an enclosure and a solid scintillator.

6. The radionuclide detection device of claim 1, wherein the scintillator comprises the fluid cell.

7. The radionuclide detection device of claim 1, wherein the scintillator is positioned adjacent an inner wall of the fluid cell.

8. The radionuclide detection device of claim 1, further comprising a detection system positioned for detection of radiation emitted by the scintillator.

9. The radionuclide detection device of claim 8, wherein the detection system comprises at least one detection system selected from the group consisting of a plurality of photodiodes and a plurality of photomultiplier tubes.

10. The radionuclide detection device of claim 1, further comprising an additive reservoir configured to add a chemical to the fluid volume.

11. A radionuclide detection device, comprising:
a fluid cell comprising a flow channel configured for passage of a fluid stream therethrough;
a first electrode positioned within the flow channel;
a second electrode positioned within the flow channel and spaced from the first electrode such that the fluid stream passes between the first electrode and the second electrode;
a scintillator positioned adjacent to the flow channel and near the first electrode.

12. The radionuclide detection device of claim 11, wherein the first electrode and the second electrode are positioned adjacent opposite sides of the flow channel.

13. The radionuclide detection device of claim 11, wherein the first electrode is positioned adjacent a wall defining the flow channel and the second electrode is positioned substantially centrally within the flow channel.

14. The radionuclide detection device of claim 11, wherein the scintillator comprises at least one of a liquid scintillator contained within an enclosure and a solid scintillator.

15. The radionuclide detection device of claim 11, further comprising a detection system positioned relative to the scintillator to detect radiation emitted therefrom.

16. The radionuclide detection device of claim 11, further comprising an additive reservoir configured to add a chemical to the fluid stream.

17. A method of detecting a radionuclide, comprising:
passing a fluid adjacent at least a portion of a radionuclide collector, wherein passing the fluid adjacent at least a portion of the radionuclide collector comprises passing the fluid between a first electrode and a second electrode;
collecting a plurality of radionuclides from the fluid with the radionuclide collector;
generating at least one scintillation pulse in a scintillator responsive to an occurrence of a decay event in at least one radionuclide concentrated adjacent the at least a portion of the radionuclide collector; and
detecting the at least one scintillation pulse.

18. The method of claim 17, further comprising applying an electrical potential between the first electrode and the second electrode.

19. The method of claim 18, wherein applying an electrical potential between the first electrode and the second electrode comprises selectively tuning the electrical potential to capture a specific radionuclide of interest.

20. The method of claim 17, wherein passing the fluid between the first electrode and the second electrode comprises passing the fluid between the first electrode positioned adjacent a wall of a flow channel and the second electrode positioned substantially in the center of the flow channel.

21. The method of claim 17, wherein passing a fluid between a first electrode and a second electrode positioned therein comprises passing the fluid between the first electrode positioned adjacent a portion of a wall of a flow channel and the second electrode positioned adjacent an opposing portion of the wall of the flow channel.

22. The method of claim 17, wherein collecting a plurality of radionuclides from the fluid stream adjacent to at least a portion of the radionuclide collector comprises collecting a plurality of radionuclides from the fluid adjacent at least a portion of the first electrode.

23. The method of claim 17, wherein passing the fluid adjacent at least a portion of the radionuclide collector comprises passing the fluid through the scintillator configured as a fluid cell.

24. The method of claim 17, further comprising adding a chemical to the fluid prior to passing the fluid adjacent the at least a portion of the radionuclide collector.

25. The method of claim 17, further comprising transmitting data relating to the at least one scintillation pulse to a remote location.

* * * * *

UNITED STATES PATENT AND TRADEMARK OFFICE
CERTIFICATE OF CORRECTION

PATENT NO.        : 7,902,510 B2
APPLICATION NO.   : 12/268559
DATED             : March 8, 2011
INVENTOR(S)       : Nicholas R. Mann, Tedd E. Lister and Troy J. Tranter Page 1 of 1

It is certified that error appears in the above-identified patent and that said Letters Patent is hereby corrected as shown below:

In the specification:

| | | |
|---|---|---|
| COLUMN 2, | LINE 49, | change "FIG. 2 ia a" to --FIG. 2 is a-- |
| COLUMN 3, | LINE 62, | change "surface at" to --surface of at-- |
| COLUMN 4, | LINE 28, | change "scintillators" wherein" to --scintillators," wherein-- |

Signed and Sealed this
Sixteenth Day of February, 2016

Michelle K. Lee
*Director of the United States Patent and Trademark Office*